US009767657B2

(12) United States Patent
Stefanik

(10) Patent No.: US 9,767,657 B2
(45) Date of Patent: *Sep. 19, 2017

(54) REMOTE CONTROL DEVICE WITH DIRECTIONAL MODE INDICATOR

(71) Applicant: AT&T Intellectual Property I, L.P., Atlanta, GA (US)

(72) Inventor: John R. Stefanik, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/861,442

(22) Filed: Apr. 12, 2013

(65) Prior Publication Data

US 2013/0222125 A1 Aug. 29, 2013

Related U.S. Application Data

(63) Continuation of application No. 13/192,508, filed on Jul. 28, 2011, now Pat. No. 8,441,389, which is a continuation of application No. 12/696,090, filed on Jan. 29, 2010, now Pat. No. 8,013,774, which is a continuation of application No. 12/116,330, filed on May 7, 2008, now Pat. No. 7,679,544, which is a continuation of application No. 11/606,723, filed on Nov. 30, 2006, now Pat. No. 7,385,548, which is a continuation of application No. 10/624,267, filed on Jul. 22, 2003, now Pat. No. 7,167,122, which is a continuation of application No. 09/751,279, filed on Dec. 29, 2000, now Pat. No. 6,750,801.

(51) Int. Cl.

| | |
|---|---|
| ***G05B 11/01*** | (2006.01) |
| ***G08C 19/16*** | (2006.01) |
| ***G08B 5/36*** | (2006.01) |
| ***G08C 17/00*** | (2006.01) |
| ***G08C 17/02*** | (2006.01) |
| ***G08C 23/04*** | (2006.01) |

(52) U.S. Cl.

CPC ............... *G08B 5/36* (2013.01); *G08C 17/00* (2013.01); *G08C 17/02* (2013.01); *G08C 23/04* (2013.01); *G08C 2201/32* (2013.01); *G08C 2201/94* (2013.01)

(58) Field of Classification Search

CPC ........................................................ G09G 5/00
USPC .................................................. 341/173, 176
See application file for complete search history.

(56) References Cited

U.S. PATENT DOCUMENTS

| | | | | |
|---|---|---|---|---|
| 4,764,981 | A | 8/1988 | Miyahara | |
| 4,977,404 | A | 12/1990 | Durst et al. | |
| 5,339,095 | A * | 8/1994 | Redford | G06F 3/021 345/158 |
| 5,532,753 | A | 7/1996 | Buchner et al. | |
| 5,648,757 | A | 7/1997 | Vernace | |

(Continued)

OTHER PUBLICATIONS

"Special Report", Printed from http://www.remotecentral.com/ces2000/xantech.htm , May 23, 2000, 1 page.

(Continued)

*Primary Examiner* — Amine Benlagsir
(74) *Attorney, Agent, or Firm* — Scott P. Zimmerman, PLLC

(57) ABSTRACT

Methods, systems, and products disclose a remote control device that controls multiple consumer electronics devices based on orientation.

12 Claims, 5 Drawing Sheets

(56) References Cited

U.S. PATENT DOCUMENTS

| | | | | |
|---|---|---|---|---|
| 5,670,955 | A | 9/1997 | Thorne et al. | |
| 5,705,997 | A | 1/1998 | Park | |
| 5,779,596 | A | 7/1998 | Weber | |
| 5,779,598 | A | 7/1998 | Lee | |
| 5,838,250 | A * | 11/1998 | Maekawa | G08C 25/02 340/12.53 |
| 5,861,583 | A | 1/1999 | Schediwy et al. | |
| 5,898,398 | A | 4/1999 | Kumai | |
| 5,917,630 | A | 6/1999 | Kadowaki et al. | |
| 5,929,904 | A | 7/1999 | Uchida | |
| 5,945,921 | A | 8/1999 | Seo | |
| 5,949,351 | A | 9/1999 | Hahm | |
| 6,002,450 | A | 12/1999 | Darbee | |
| 6,008,735 | A | 12/1999 | Chiloyan | |
| 6,031,579 | A | 2/2000 | Stephenson | |
| 6,130,624 | A | 10/2000 | Guyer | |
| 6,130,726 | A | 10/2000 | Darbee | |
| 6,160,491 | A | 12/2000 | Kitao | |
| 6,188,391 | B1 | 2/2001 | Seely et al. | |
| 6,208,341 | B1 | 3/2001 | vanEe | |
| 6,278,499 | B1 | 8/2001 | Darbee | |
| 6,285,357 | B1 * | 9/2001 | Kushiro et al. | 345/169 |
| 6,346,891 | B1 | 2/2002 | Feinleib | |
| 6,407,779 | B1 | 6/2002 | Herz | |
| 6,529,144 | B1 * | 3/2003 | Nilsen et al. | 341/20 |
| 6,567,011 | B1 * | 5/2003 | Young | H04B 1/202 340/12.28 |
| 6,603,420 | B1 | 8/2003 | Lu | |
| 6,750,801 | B2 | 6/2004 | Stefanik | |
| 6,903,655 | B2 | 6/2005 | Stefanik | |
| 6,906,700 | B1 | 6/2005 | Armstrong | |
| 6,946,970 | B2 | 9/2005 | Stefanik | |
| 7,102,616 | B1 * | 9/2006 | Sleator | G06F 3/0325 345/156 |
| 7,167,122 | B2 | 1/2007 | Stefanik | |
| 7,385,548 | B2 | 6/2008 | Stefanik | |
| 7,653,926 | B2 | 1/2010 | Stefanik | |
| 7,679,544 | B2 | 3/2010 | Stefanik | |
| 8,013,774 | B2 | 9/2011 | Stefanik | |
| 2001/0042245 | A1 | 11/2001 | Iwamura | |
| 2002/0059218 | A1 | 5/2002 | August et al. | |
| 2002/0068556 | A1 | 6/2002 | Brown | |
| 2002/0084912 | A1 | 7/2002 | Stefanik | |
| 2002/0093491 | A1 | 7/2002 | Gillespie et al. | |
| 2002/0122027 | A1 | 9/2002 | Kim | |
| 2003/0030619 | A1 | 2/2003 | Martin et al. | |

OTHER PUBLICATIONS

"Wave Home Automation," printed from http://remotecectral.com/ces2000/zilog.htm, May 23, 2000, 1 page.

"Stargate—The Next Generation in Automation," printed from http://www.jdstechnologies.com on May 23, 2000, 4 pages.

Everett, D., "Smart Card technology: Introduction to Smart Cards", Smart Card news, Apr. 1999, 22 pages.

"Philips Pronto Remote Control," printed from http://www.remotecentral.com/pronto/index1.htm, May 26, 2000, 2 pages.

"RTI Theater Touch T2," printed from http://www.remotecentral.com/touch/index2.htm, May 22, 2000, 2 pages.

"Home Theater Master SL-9000," printed from http://www.remotecentral.com/s19000/index2.htm, May 22, 2000, 2 pages.

* cited by examiner

REMOTE CONTROL DEVICE WITH DIRECTIONAL MODE INDICATOR

CROSS-REFERENCE TO RELATED APPLICATIONS

This application is a continuation of U.S. application Ser. No 13/192,508, filed Jul. 28, 2011 and now issued as U.S. Pat. No. 8,441,389, which is a continuation of U.S. application Ser. No. 12/696,090, filed Jan. 9, 2010, and now issued as U.S. Pat. No. 8,013,774 which is a continuation of U.S. application Ser. No. 12/116,330, filed May 7, 2008, and now issued as U.S. Pat. No. 7,679,544 which is a continuation of U.S. application Ser. No. 11/606,723, filed Nov. 30, 2006 and now issued as U.S. Pat. No. 7,385,548 , which is a continuation of U.S. application Ser. 10/624,267, filed Jul. 22, 2003 and now issued as U.S. Pat. No. 7,167,122 , which is a continuation of 09/751,279, filed Dec. 29, 2000 and now issued as U.S. Pat. No. 6,750,801 , and all these applications are incorporated herein by reference in their entireties.

STATEMENT REGARDING FEDERALLY SPONSORED RESEARCH (Not applicable)

BACKGROUND OF THE INVENTION

Field of the Invention

The present invention is directed generally to a remote control device and, more specifically, to a remote control device with a directional mode indicator.

Description of the Background

Virtually every consumer electronic (CE) device sold today comes with its own remote control. As a result, it is not uncommon for households to have as many as three different remote control devices to control separate CE devices on the living room coffee table, thus introducing clutter and confusion as to the remote control that controls each particular CE device. The home electronics industry has responded to consumer frustrations with the introduction of universal remote devices. A universal remote control can be “taught” to take the place of all of the individual remote controls, thus allowing reduction of the number of remote controls per household to one.

Even though using a universal remote control has many advantages, it at the same time, introduces new problems. For one, it is difficult to determine the current mode of operation of the universal remote control merely by visual inspection. In addition, once the mode of operation is determined, a sequence of buttons must be pressed to change the mode of operation of the remote control to that of another CE device. Thus, there is a need for a remote control in which the mode of operation may be more easily changed.

Another significant problem with universal remote controls is that no feedback is given to the user to identify the source of transmittal problems between the remote control and the CE device such as a weak remote control signal, low battery power, an incorrect mode of operation, a malfunctioning set-top box, and other such problems. Thus, there exists a need for a feedback device that indicates the mode of operation of the remote control whenever the buttons of the remote control are pressed to assist in diagnosing the source of transmittal problems. Further, there exits a need for a remote control having a feedback device that indicates weak signal strength and/or low battery power.

In addition, many remote control users also find it frustrating to have to press a button or tap an LCD screen on the remote control that cannot be seen in a dark room in order to light the remote control’s buttons. Further, pressing a random button or randomly tapping the LCD screen in the dark may trigger a remote control function that the user did not intend. Thus, there exists a need for a remote control having illumination whenever the remote control is moved or picked up.

Advanced technophile users demand the functionality of universal remote control devices to become increasingly more sophisticated. For example, an experienced technical user may wish to do as much as the user can with a single remote control device. In addition, a home electronics maven might wish to be visually or audibly alerted to incoming telephone calls, or to a favorite television show starting, from the mobile remote control independent of the typically immobile set-top box or other CE device, which may be off when such an event occurs, thereby causing the user to miss that event. In addition, some advanced consumers may appreciate having the means to save and retrieve individualized settings of each CE device and/or their user profile from their remote control instead of having to use the set-top box to access these individualized settings and user profiles.

SUMMARY OF THE INVENTION

The present invention is directed to a remote control device including a processor and a motion detector in communication with the processor. The device also includes at least one input device in communication with the processor and a directional mode indicator in communication with the processor, the directional mode indicator for indicating the mode of operation of the device based on a signal generated by the motion detector.

The present invention represents a substantial advance over prior remote control devices. The present invention has the advantage that the remote control device can indicate the mode of operation of the device based on tilting of the device.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENT

It is to be understood that the figures and descriptions of the present invention have been simplified to illustrate elements that are relevant for a clear understanding of the present invention, while eliminating, for purposes of clarity, many other elements found in a typical device. Those of ordinary skill in the art will recognize that other elements are desirable and/or required to implement a device incorporating the present invention. However, because such elements are well known in the art and because they do not facilitate a better understanding of the present invention, a discussion of such elements is not provided herein.

Figure 1:
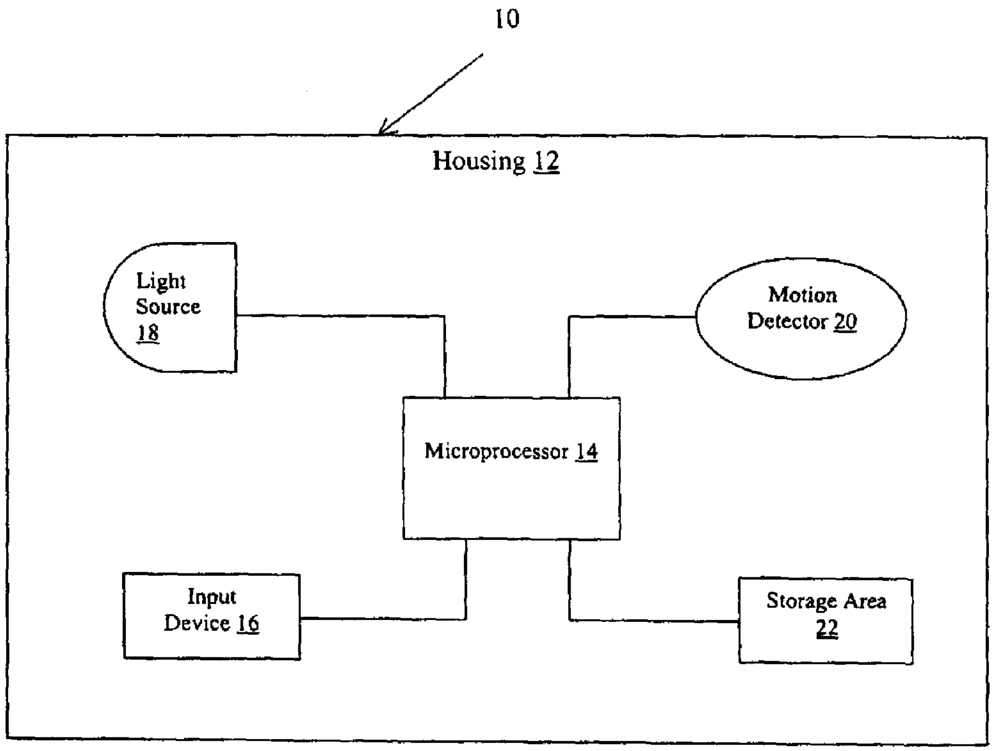
FIG. 1 is a block diagram of a remote control device with motion-detected illumination according to one embodiment of the present invention.

FIG. 1 is a block diagram illustrating a remote control device 10 with motion-detected illumination according to one embodiment of the present invention. The device 10 includes a housing 12 that contains the circuitry of device 10. Within the housing 12 are a microprocessor 14, an input device 16, a light source 18, a motion detector 20, and a data storage area 22.

According to one embodiment of the present invention, the housing 12 may be constructed of a durable material such as, for example, a lightweight metal such as, for example, aluminum, titanium or a long-lasting alloy. According to another embodiment, the housing 12 may be constructed of a heavy duty plastic such as, for example, PVC, ABS, or Fiber-reinforced plastic (FRP). According to still another embodiment, the housing 12 may be constructed of rubber or of any other material or any combination of materials than is capable of withstanding constant handling and use.

The motion detector 20 can be any type of detector that senses when the device 10 is moved and can be of any type of mechanical switch such as, for example, a mercury switch or a gravity-based switch or of any type of electronic sensor.

The microprocessor may be of any type of microprocessor appropriate such as, for example, AMD's K5, K6, or K7 series, Intel's Pentium series, Cyrix's 6×86 or Mxi series, IDT's WinChip series, or Rise's mP6 or any other suitable microprocessor. The data storage area 22 may be any data storage means that is utilized to store, retain and send computer readable instructions to the microprocessor such as; for example, the M-Systems flash memory chip; persistent data memory chips such as, for example, EEPROM, battery-backed SRAM or mask ROM; or temporary-data-storage memory chips, such as, for example, DRAM, SRAM or ferroelectric RAM (FRAM); or any combination of the above data-storage memory chips. According to another embodiment of the present invention, the microprocessor and the data storage area may be combined onto a single chip such as, for example, Atmel's 16-Mbit ConcurrentFlash dual-bank device or STMicroelectronics and Waferscale Integration's NOR-based Flash+ technology.

The light source 18 may be, for example, an incandescent, fluorescent, electro-luminescent, or low-voltage light source, multicolored LEDs, or any lighting means that illuminates a portion or all of the input device 16. The input device 16 may be an alphanumeric keyboard or buttons, arrowed buttons, plain buttons, an LCD screen, a touch screen, a joystick, a stylus, a mouse, a keypad, a modem jack or any means that can be utilized by the user to input information.

When the motion detector 20 detects movement, the motion detector 20 transmits a signal to the microprocessor 14 indicating the movement. The motion detector 20 is connected to a microprocessor 14 and detects movement of the device 10. The microprocessor 14, in turn, after retrieving instructions from the data storage area 22, sends a signal to the light source 18. Upon receipt of the message, the light source 18 illuminates all or a portion of the input device 16 so that the input device 16 may be more readily seen in dark environments. According to one embodiment, a portion or all of the input device 16 may be backlit by the light source 18. Alternatively, in another embodiment, the light source 18 may shine down upon the input device 16 from an extending projection or projections of the housing 12 to illuminate the input device 16. The light sources 18 may thus be a single light that lights the input device 16 or may be, for example, a grid of lights, with each light corresponding to, for example, a button on the input device 16. In another embodiment, a portion of the device 10 not used for input such as, for example, a border around the top side of the device 10, may be backlit by the light source 18, thus shedding light on the input device 16. Optionally, after a pre-set period of time (e.g., five to ten seconds) without the remote control device 10 moving or without any input from the input device 16, one embodiment of the present invention may have the microprocessor 14 send a signal to the light source 18 to cease the illumination of the input device 16. In addition, according to another embodiment, the remote control device 10 may have a button or some other physical means of input that activates the illumination of the input device 16 so the user is not limited to moving the remote control device 10 to trigger illumination. Further, in another embodiment of the present invention, the automatic illumination due to movement feature of the remote control device 10 may be turned off with, for example, a user-controllable switch to save battery life.

Figure 2:
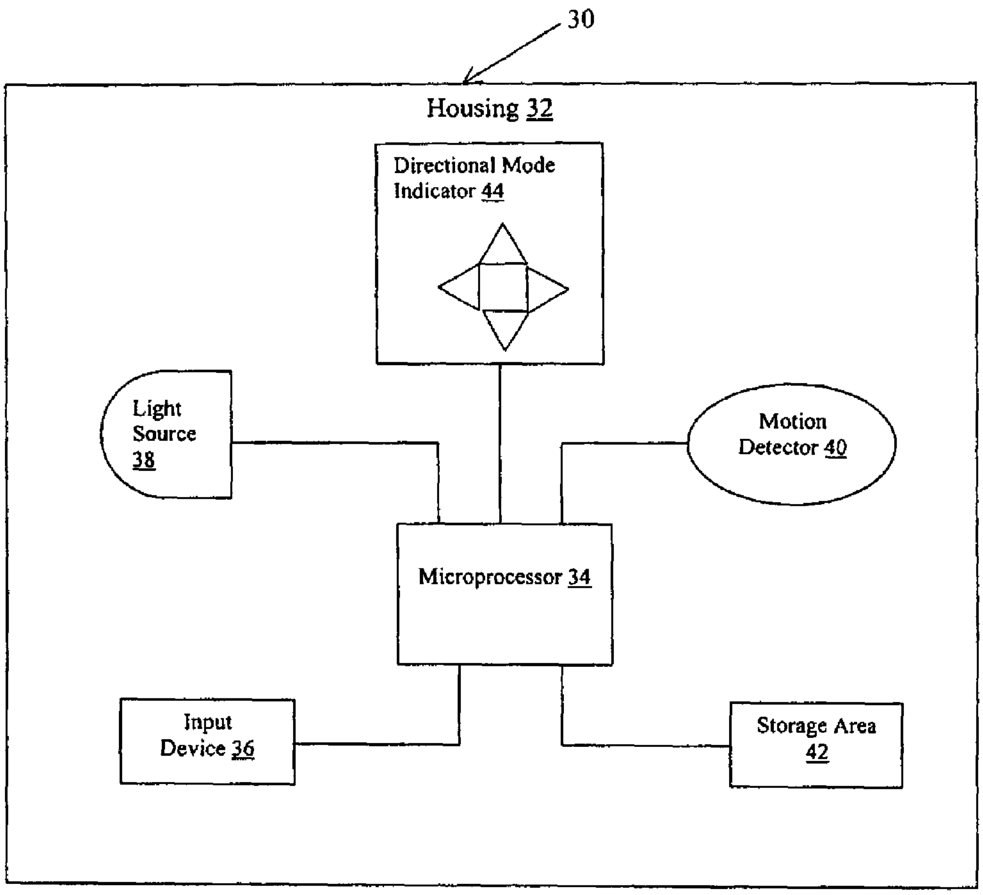
FIG. 2 is a block diagram of a remote control device with an automatic positional mode of operation changer according to another embodiment of the present invention.

FIG. 2 is a block diagram of a remote control device 30 with an automatic positional mode of operation changer according to another embodiment of the present invention. The remote control device 30 is similar to the remote control device 10 described hereinbefore in conjunction with FIG. 1 with the exception that the remote device 30 in FIG. 2 also includes a motion detector 40 that detects a different type of motion than that of the motion detector 20 in FIG. 1. The remote control device 30 also includes a directional mode indicator 44. The motion detector 40 may be a gravity switch or any gyroscope-type device that can detect changes from horizontal in at least two degrees of freedom.

The motion detector 40 detects the tilting or absence of tilting of the apparatus 30 and sends a signal to the microprocessor 34 indicating the direction of the tilt or lack thereof. After receiving the tilt directional information, the microprocessor 34, acting on informational instructions retrieved from data storage area 42, changes the mode of operation of the apparatus 30 to correspond to the appropriate consumer electronic device. The appropriate consumer electronic device may be, for example, a television, a VCR, a DVD, a DVR, a satellite, a cable or HDTV controller, home theater system components, or stereo system components, indicated by the tilt of the apparatus 30. A number of different orientations of the remote device 30 may correspond to a separate operational mode. Therefore, when a particular orientation of the remote control device 30 is detected, the microprocessor 34 may then assume the appropriate operational mode.

The microprocessor 34 may be programmed to detect the orientation of the device 30 based on feedback from the motion detector 40 and thus determine the mode of operation of the device 30 by any of a number passive programming techniques, such as, for example, numeric code programming, automatic programming, learned method programming, downloading from a personal computer, button presses or any of the typical means used to program remote controls to accept the codes recognized by consumer electronic devices. In addition to changing the mode of operation, in another embodiment of the present invention, the microprocessor 34 may transmit a message to the Light source 38 to illuminate the corresponding directional mode indicator 44 so the user, at a glance, can determine the direction of the orientation of the device 30 and thus the mode of operation of the remote control device 30.

According to one embodiment of the present invention, the direction of the orientation and the corresponding mode of operation may be indicated by the directional mode indicator 44 which may consist of an arrangement of arrows corresponding to the different orientation directions. According to another embodiment of the present invention, the arrow corresponding to the direction of the orientation may light up when the remote control device 30 is tilted in that direction. The light source 38 may be any lighting means described hereinbefore in FIG. 1 that fully illuminates the direction mode indicator 44. According to another embodiment, the directional mode indicator 44 is not limited to visual signals. Any means that adequately relays the tilt and mode of operation information of, for example, a television, a VCR, a DVD, a satellite, cable or HDTV controller, home theater system components, or stereo system components, may be used.

Figure 3:
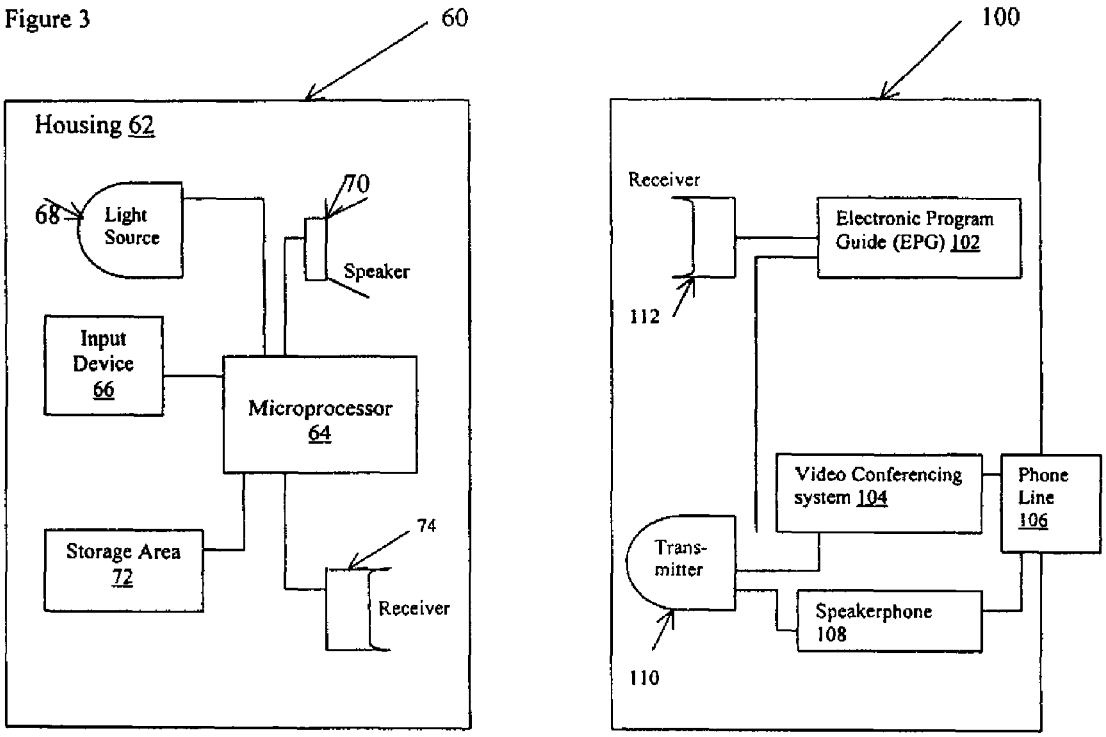
FIG. 3 is a block diagram of a remote control device with an automatic event notifier and a corresponding consumer electronic device that interacts with the remote control device according to another embodiment of the present invention.

FIG. 3 is a block diagram illustrating a remote control device 60 with an automatic event notifier and a corresponding consumer electronic device 100 that interacts with the remote control device 60 according to another embodiment of the present invention. The remote control device 60 is similar to the remote control device 10 described hereinbefore in FIG. 1 except that the remote control device 60 in this embodiment also incorporates a speaker 70 and a receiver 74 within the housing 62.

The consumer electronic device 100 has the capability to be programmed to keep track of scheduled events, such as television shows or sporting event starting times, through an electronic program guide 102. The consumer electronic device 100 has a terminal connection 106 for receiving data via a telephone line. The consumer electronic device 100 may be, for example, a typical set-top box commonly used by HDTV, satellite or cable television companies or any consumer electronic device such as a television, a VCR, DVD, home theater system components, stereo system components, or a digital video recorder (DVR). Besides the electronic program guide 102 and the terminal connection 106 to a telephone line, the consumer electronic device 100 may additionally include a receiver 112 and at least one transmitter 110 to communicate with the remote control device 60. The consumer electronic device 100 may also include a speakerphone 108 and/or a video conferencing system 104.

When a scheduled event occurs via the electronic program guide 102 or when a telephone call is received via the telephone terminal connection 106, the consumer electronic device 100 may transmit a message via the consumer electronic device transmitter 110 to the receiver 74 of the remote control device 60. Electromagnetic waves such as, for example, infrared (IR), radio frequency (RF), X-10, pulsed codes, sound waves, microwave, or any typical remote control signaling technique may be utilized to pass the message between the consumer electronic device transmitter 110 and the remote control device receiver 74.

When the receiver 74 receives the signal concerning an incoming event from the consumer electronic device 100, the receiver 74 may transmit a signal to the microprocessor 64. The microprocessor 64 may, in turn, retrieve informational instructions from the data storage area 72, interpret the signal using the instructions, and provide an alert to a user that a scheduled event is about to occur or that there is an incoming telephone call by activating the speaker 70 and/or the light source 68. The light source 68 may be any lighting means that can be fully customized to represent different scheduled events or incoming telephone calls. Additionally, the speaker 70 may emit brief "chirps" or "clicks" with varying pitches and tones programmed to represent different scheduled events or incoming telephone calls. However, the visual and audio alerts are not limited to these responses. According to other embodiments, other alerts may be used to allow the user to easily locate the remote control device 60 and recognize the event that is occurring.

Both audio and visual responses may be customizable and programmed to be unique to the different incoming signals from the electronic program guide 102, the video conferencing system 104 or the speakerphone 108 of the consumer electronic device 100. For example, according to one embodiment of the present invention and in the case of an incoming telephone call, the input device 66 could have a caller id function so the user can determine who was calling before activating the speakerphone. In another embodiment and in the case of a scheduled event, the input device 66 could display what event is about to occur. According to one embodiment of the present invention, activating the input device 66 may turn off the audio and visual alerts by the speaker 70 and light source 68 and acknowledge the programmed event from the electronic program guide 102 or the incoming telephone or video conferencing call through the speakerphone 108 or video conferencing system 104 from the consumer electronic device 100.

According to one embodiment of the present invention, the consumer electronic device 100 does not need to be powered on when the event occurs or the telephone call is received. The remote control device 60 will still receive the notification from the consumer electronic device 100 and will alert the user to the event or call. Activating the input device 66 after an alert will power on the consumer electronic device 100 if selected by the user.

Figure 4:
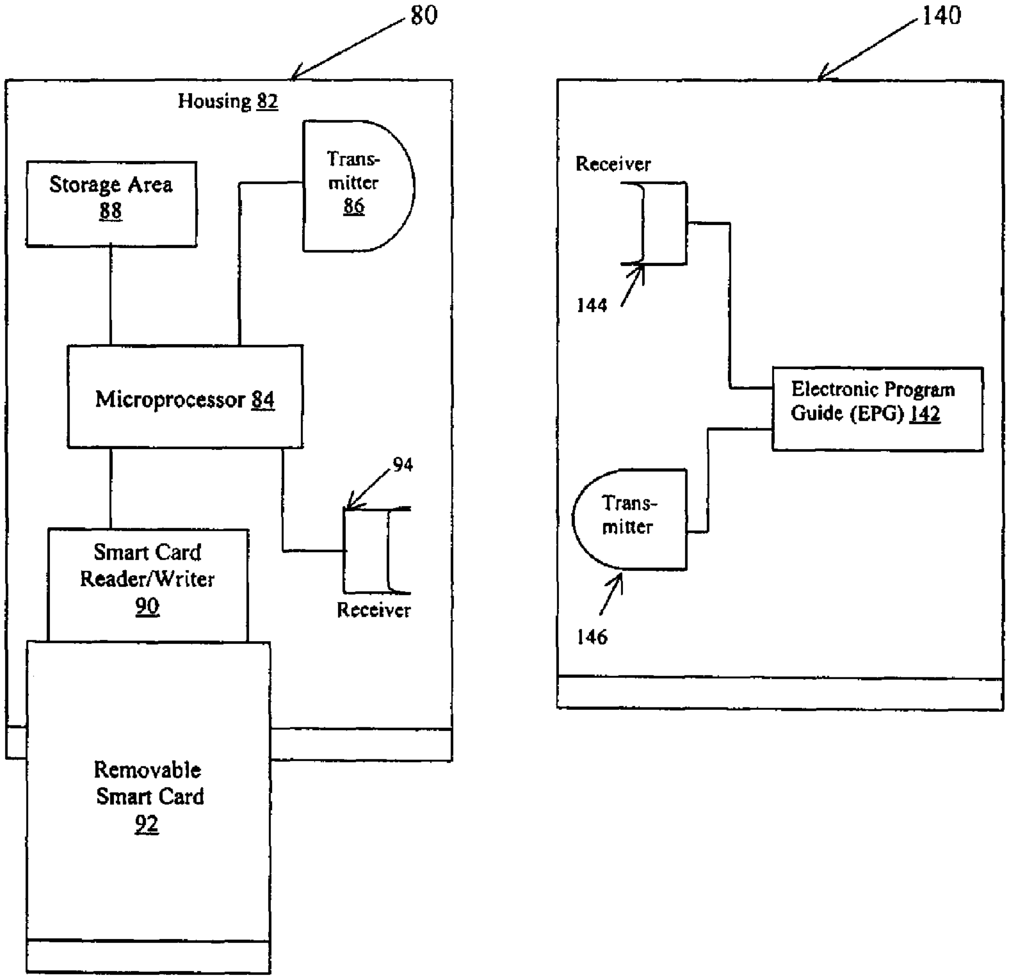
FIG. 4 is a block diagram of a remote control device with a smart card reader/writer and a corresponding consumer electronic device that interacts with the remote control device according to another embodiment of the present invention.

FIG. 4 is a block diagram is a remote control device 80 with a smart card reader/writer and a corresponding consumer electronic device 140 that interacts with the remote control device 80 according to another embodiment of the present invention. The consumer electronic device 140 includes an electronic program guide 142, a receiver 144 and at least one transmitter 146 to communication with the remote control device 80.

The remote control device 80 is similar to the remote control device 10 described herein before in conjunction with FIG. 1. However, the remote control device 80 also incorporates within the housing 82 at least one transmitter 86, a receiver 94, and a smart card reader/writer 92. The smart card reader/writer 92 is of a suitable type such as, for example, a manual insertion, manual swipe, motorized insertion, hybrid, TTL, RS232, proximity or any other appropriate variety of smart card reader/writer. However, the smart card reader/writer in the remote control device 80 is not limited to any particular type of smart card reader/writer listed above. The removable smart card 92 can be of any type of smart card including a contact, contactless, combi or hybrid type with either an embedded microprocessor or memory chip.

A removable smart card 92 may be inserted by the user into the smart card reader/writer 90 of the remote control device 80. The removable smart card 92 may contain information concerning user profiles, user history, favorite shows, favorite channels, favorite themes, channel order, reminders for favorite shows, parental controls, audio and visual settings, pay-for-view purchases and spending limits or any information that a user may want individualize for use with the consumer electronic devices.

The information stored on the removable smart card 92 could also contain user Internet profiles and information including access to email, Internet browser bookmarks, account names, address lists, hosts, security features, and display formats pertaining to Internet browsing on a television monitor. According to one embodiment, the removable smart card 92 does not need to be remote control specific. The user may be able to take the removable smart card 92 anywhere there is a compatible remote control 80 to access personal information on the removable smart card 92. In addition, the removable smart card 92 could store promotional information allowing the user to take the removable smart card 92 to other locations to receive coupons, discounts or special merchandise.

The information stored on the smart card 92 may be read by the smart card reader/writer 90 and sent to the microprocessor 84. The microprocessor 84, after retrieving informational instructions from the data storage area 88, transmits the information to the transmitter 86. The transmitter 86, in turn, transmits the information read from the removable smart card 92 to the receiver 144 of the consumer electronic device 140. The transmitter 86 may transmit information via electromagnetic waves such as, for example, infrared (IR), radio frequency (RF), X-10, pulsed codes, sound waves, microwave or any type of remote control signal that can be interpreted easily by the receiver 144. The receiver 144 then relays the information to the electronic program guide 142, which then acts upon the information received.

When information such as, for example, sound and video settings, is updated on the consumer electronic device 140, the information may be sent to the transmitter 146 and then sent out to the receiver 94 of the remote control device 80. The receiver 94 in turn may transmit the new information to the microprocessor 84, which retrieves informational instructions from the data storage area 88 and relays the information to the smart card reader/writer 90. Upon receipt of the information from the microprocessor 84, the smart card reader/writer 90 writes the new information on the removable smart card 92. Having the smart card reader/writer 90 in the remote control device 80 allows multiple users to move between several different removable smart cards 92 easily and quickly since the user no longer needs to have to walk over to the consumer electronic device 140 to swap out different smart cards, thus increasing convenience and productivity.

Figure 5:
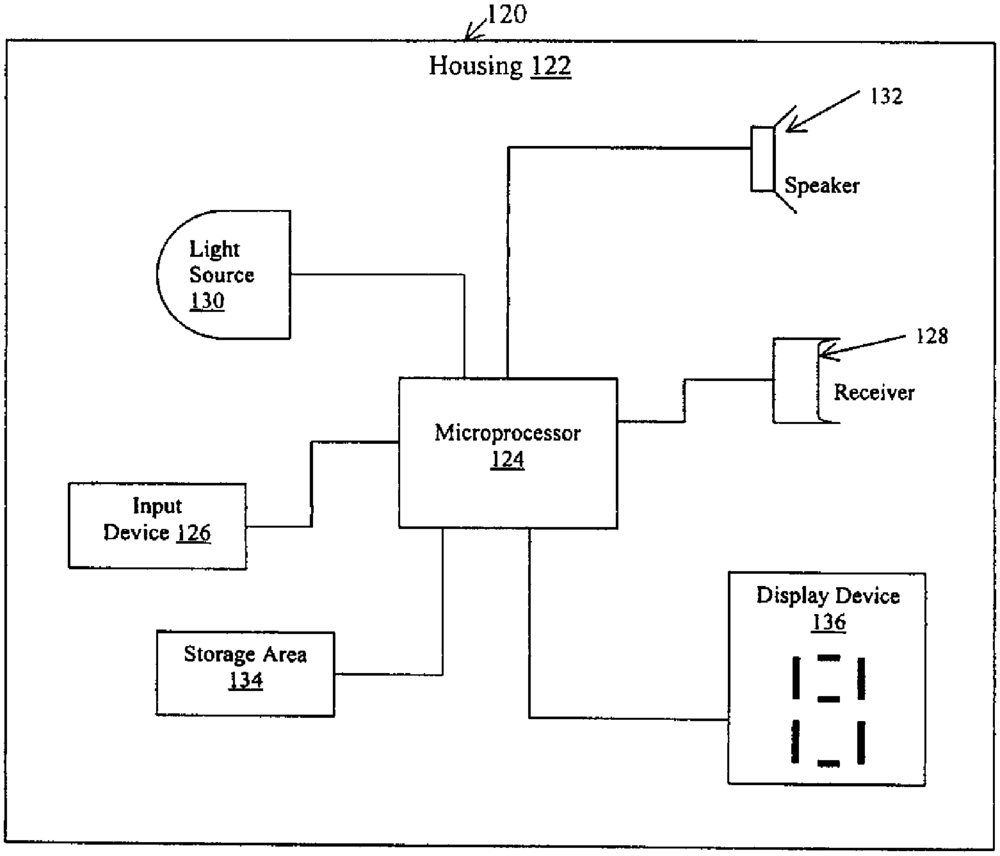
FIG. 5 is a block diagram of a universal remote feedback device according to another embodiment of the present invention.

FIG. 5 is a block diagram for a universal remote feedback device 120 according to another embodiment of the present invention. The universal remote feedback device 120 is programmed to respond to the signals sent by a consumer electronic (CE) device and its corresponding remote control device as a means of feedback to input entered into the remote control device. The universal remote feedback device 120 is similar to the remote control device 10 described hereinbefore in conjunction with FIG. 1. The device 120 may also include a receiver 128, a speaker 132, and a display device 136.

The universal remote feedback device 120 may be programmed using any suitable programming techniques such as, for example, numeric code programming, automatic programming, learned method programming, downloading from a personal computer, and button presses or any of typical means being used to program universal remote controls to accept the codes needed to operate consumer electronic devices. According to one embodiment, the universal remote feedback device 120 may be attached to a CE device. In another embodiment, the universal remote feedback device 120 may be attached to the CE device's remote control. In yet another embodiment, the universal remote feedback device 120 may be attached to a commercially available universal remote control. In all embodiments, it is imperative that the device, either the CE device or the remote control device, to which the universal remote feedback device 120 is attached does not have its signal blocked and the universal remote feedback device 120 can receive the feedback signal the user wants.

When the receiver 128 of the universal remote feedback device 120 receives a signal from a CE device or its remote control, the universal remote feedback device 120 transmits a message to the microprocessor 124. The microprocessor 124 retrieves informational instructions from the data storage area 134 and activates the speaker 132 and light source 130. The sound and light produced is customizable and can be unique to each device programmed into the universal remote feedback device 120. The light source 130 may be, for example, multicolored LEDs or any lighting means that can be fully customized. The speaker 132 could emit brief "chirps" or "clicks" with varying pitches and tones programmed to represent different consumer electronic devices.

According to one embodiment, the display device 136 may display multiple alphanumeric characters as an indication of what device sent the signal to the universal remote feedback device 120. For example, if the universal remote control were in DVD mode, the display device 136 would show "DVD" each time input is received by the universal remote control device 120. The user may select whether to have audio feedback, visual feedback, alphanumeric feedback, or any combination of feedback. However, other means of feedback are available to the user and should not be limited to those described. The display device 136, speaker 132 and light source 130 as well as other means of feedback also may provide feedback when there is a weak signal, low battery power or other transmittal problems associated with either the remote control device and consumer electronic device.

Although the present invention has been described herein with reference to certain embodiments, numerous modifications and variations can be made and still the result will come within the scope of the invention. No limitation with respect to the specific embodiments disclosed herein is intended or should be inferred.

The invention claimed is:

1. A remote control, comprising:

a processor; and a memory device, the memory device storing instructions, the instructions when executed causing the processor to perform operations, the operations comprising:

receiving an orientation of a plurality of different orientations indicating a two-dimensional tilt of a plurality of different two-dimensional tilts of the remote control, the two-dimensional tilt detected by an electronic sensor in the remote control;

querying for the orientation of the remote control, the remote control storing electronic associations between different consumer electronics devices and the plurality of different orientations associated with the plurality of different two-dimensional tilts of the remote control, with each one of the plurality of different orientations associated with each one of the plurality of different two-dimensional tilts and corresponding to each one of the different consumer electronics devices detected by the electronic sensor;

identifying a consumer electronics device of the different consumer electronics devices that is electronically associated with the orientation indicating the two-dimensional tilt of the remote control detected by the electronic sensor;

storing multiple operational modes in the memory device of the remote control, each one of the multiple operational modes corresponding to said each one of the different consumer electronics devices;

identifying an operational mode of the multiple operational modes in the memory device that is electronically associated with the consumer electronics device that is electronically associated with the orientation indicating the two-dimensional tilt detected by the electronic sensor; and illuminating an arrow on a display of the remote control, the arrow corresponding to the consumer electronics device identified in response to the orientation indicating the two-dimensional tilt of the remote control, the display of the remote control having different illuminated arrows with each one of the different illuminated arrows corresponding to said each one of the different consumer electronics devices that is controllable by the remote control in response to the two-dimensional tilt.

2. The remote control of claim 1, wherein the operations further comprise illuminating a light in response to the two-dimensional tilt.

3. The remote control of claim 1, wherein the operations further comprise illuminating a keypad in response to the two-dimensional tilt.

4. The remote control of claim 1, wherein the operations further comprise illuminating a light source in response to the two-dimensional tilt.

5. The remote control of claim 1, further comprising a light for indicating the consumer electronics device.

6. A method, comprising:

executing instructions stored in a memory device that cause a device to operate as a remote control;

receiving an orientation of a plurality of different orientations representing a two-dimensional tilt of a plurality of different two-dimensional tilts of the remote control that is detected by an electronic sensor, the electronic sensor housed within a housing of the remote control;

querying a data storage for the orientation representing the two-dimensional tilt of the remote control, the data storage having electronic associations between different consumer electronics devices and the plurality of different orientations representing the plurality of different two-dimensional tilts of the remote control, with each one of the plurality of different orientations corresponding to each one of the different consumer electronics devices;

determining a consumer electronics device of the different consumer electronics devices that corresponds to the orientation representing the two-dimensional tilt of the remote control, the consumer electronics device electronically associated in the data storage to the orientation representing the two-dimensional tilt of the remote control;

storing multiple operational modes in the data storage of the remote control, each one of the multiple operational modes corresponding to said each one of the different consumer electronics devices;

retrieving an operational mode from the data storage, the operational mode electronically associated with the consumer electronics device determined in response to the orientation representing the two-dimensional tilt of the remote control; and illuminating an arrow on a display incorporated into the housing of the remote control, the arrow corresponding to the consumer electronics device identified in response to the orientation representing the two-dimensional tilt of the remote control, the display of the remote control having different illuminated arrows with each illuminated arrow of the different illuminated arrows corresponding to said each one of the different consumer electronics devices that is controllable by the remote control in response to the two-dimensional tilt.

7. The method of claim 6, further comprising indicating the two-dimensional tilt of the remote control.

8. The method according to claim 6, further comprising illuminating a light that indicates the mode of operation.

9. The method of claim 6, further comprising receiving an input to the remote control.

10. The method according to claim 9, further comprising illuminating an input device that receives the input.

11. The method according to claim 6, further comprising illuminating a light that corresponds to the consumer electronics device.

12. The method of claim 6, further comprising activating a light source.

* * * * *